L. K. STEPHENS.
LINTER FLOAT DRIVING MECHANISM.
APPLICATION FILED JULY 13, 1911.

1,139,596.

Patented May 18, 1915.

WITNESSES:
J. B. Bowling
Lilan Schley

INVENTOR
L. K. STEPHENS.
BY Jack A. Schley
ATTORNEY

UNITED STATES PATENT OFFICE.

LOUIS K. STEPHENS, OF DALLAS, TEXAS.

LINTER-FLOAT-DRIVING MECHANISM.

1,139,596.  Specification of Letters Patent.  Patented May 18, 1915.

Application filed July 13, 1911.  Serial No. 638,279.

*To all whom it may concern:*

Be it known that I, LOUIS K. STEPHENS, citizen of the United States, residing at Dallas, in the county of Dallas and State of Texas, have invented certain new and useful Improvements in Linter-Float-Driving Mechanism, of which the following is a specification.

This invention relates to float drives for cotton linters.

The object of the invention is to produce a positive driving mechanism for a float and to obviate the use of a belt tightening idler, but at the same time permitting the breast of the linter to be partially raised without disturbing the tension or adjustment of the driving mechanism.

Another object is to provide a clutch which interrupts the transmission of rotation to the float when the breast is elevated and which is thrown into engagement with a clutch hub to transmit motion to the float when the breast is lowered.

A still further object of the invention is to provide a mechanism of the character described that will be strong, durable, efficient, simple and comparatively inexpensive to construct, also one in which the several parts will not be likely to get out of working order.

Figure 1:
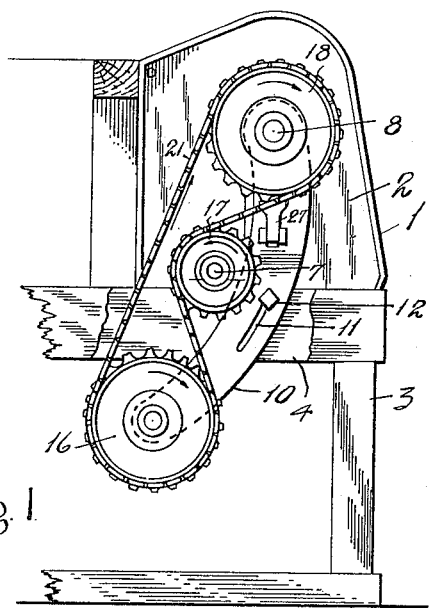
Figure 2:
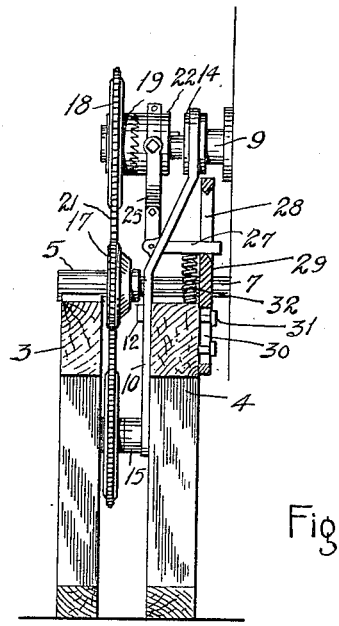
Figure 3:
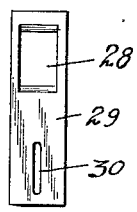
Figure 4:
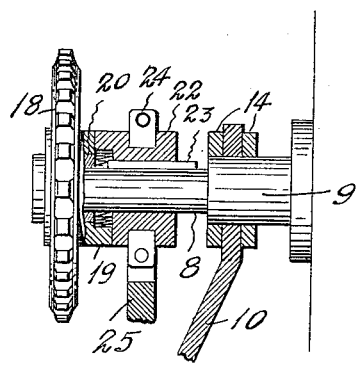
Figure 5:
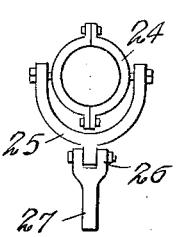

With the above and other objects in view the invention has relation to certain novel features of construction and operation, an example of which is described in the following specification and illustrated in the accompanying drawings, wherein:

Figure 1 is an elevation of a portion of the end of a linter and showing the driving mechanism connected thereto, Fig. 2 is a front elevation of the same, Fig. 3 is a detail of the clutch tripping plate, Fig. 4 is a detail of the clutch and adjacent parts in section, and Fig. 5 is a detail of the clutch yoke and ring in elevation.

In the drawings the numeral 1 designates a portion of an ordinary linter, 2 the end plate, 3 the outer standard, 4 the inner standard, 5 the journal box mounted on the outer standard and supporting the saw shaft 7, 8 the float shaft and 9 the bearing sleeve for the shaft 8. All of the parts referred to are of the usual construction now in common use. It is the purpose of this invention to attach the driving mechanism to said parts without altering or changing the same and said mechanism is constructed with this result in view.

Between the standards a curved support or spacing bar 10 is mounted. This support is curved in order to swing past the saw shaft 8 and the box 5. Near its central portion the support has a curved slot 11 through which a screwbolt 12 is passed and secured in the adjacent side of the inner standard. The bolt holds the support in position and the slot permits it to move vertically. Just above the bearing box the support is offset toward the end plate of the linter as is best shown in Fig. 2; while the extreme upper end of the support is formed parallel with the lower portion and engaged about the journal sleeve 9 of the float shaft. The upper end of the support is loosely confined on said sleeve between collars 14 suitably secured on the sleeve as shown in Figs. 2 and 4.

The breast of which the end plate 2 forms a part, is commonly pivoted or hinged along its upper rear edge and usually elevated by a lever which is not shown in the drawings. When the end plate is swung upward, the sleeve 9 being attached thereto, it is obvious that the support 10 will also be swung upward and consequently a driving mechanism carried by said support would be carried upward thereby.

At the lower end of the support an outwardly directed boss 15 is provided and formed with a suitable bearing to receive and support a sprocket wheel 16. On the saw shaft 7 between the standards a sprocket wheel 17 is fastened. This wheel is less in diameter than the wheel 16 and owing to the fact that the box 5 projects inward a short distance beyond the inner side of the standard 3, said wheel 17 is dished and has its hub off-set as shown in Fig. 2, thus permitting its teeth to be in line vertically with the teeth of the wheel 16.

On the end of the float shaft 8 a sprocket wheel 18 is secured. This wheel has substantially the same diameter as the wheel 16, although this is not essential. The wheel 18 has its teeth in alinement with the teeth of the other wheels and is provided with an inwardly directed clutch hub 19, the latter being recessed to receive a collar 20 which is made fast on the float shaft and holds the wheel 18 against movement inward as is shown in Fig. 4.

A sprocket chain 21 passes about and between the wheels 16 and 18. One leg or "run" of the chain engages with the sprocket wheel 17 from the rear. The centers of the three wheels being substantially in line, the chain in passing over the wheel 17 will be carried at such angles as to retain its engagement with the wheels and run under the proper tension without the necessity of an idler. In Fig. 1 the direction of revolution of the wheels and travel of the chain is indicated by arrows. Motion is imparted by the saw shaft 7, the wheel 17 thus being the driving sprocket and the wheels 16 and 18, driven sprockets. It is apparent that the wheels 16 and 18 being spaced apart by the support 10, the distance between their centers is never varied, although said wheels and support are moved vertically when the breast is elevated. During this movement the relative position of the wheels 16 and 18 to the wheel 17 is changed, but the tension of the chain is not varied.

On the float shaft 8 between the clutch hub 19 and the sleeve 9, a clutch member 22 is mounted to slide. A spline 23 is embedded in the shaft 8 and has a seat in the member 22 whereby motion is transmitted by the member to the shaft. Both the clutch hub and member have inclined teeth. A split ring 24 is mounted in a groove in the member 22 and is held in a yoke 25 pivoted thereto. This yoke hangs below the said member and has pivotal connection at 26 with the upper end of a bell-crank lever 27 which is pivoted in the off-set portion of the support 10, the latter being slotted to permit a free swing of the lever. The horizontal arm of the lever extends inward over the standard 4 and projects through a slot 28 provided in a plate 29 extending vertically and fastened to the inner side of the standard 4. This plate has an adjusting slot 30 through which screws 31 pass and are driven in the standard 4. The upper and lower edges of the slot 28 are reduced in thickness so that the lever 27 may rock thereon.

Normally the plate 29 is adjusted so that the lever 27 will engage the lower edge of the slot 28, thus holding the clutch member 22 in engagement with the clutch hub 19. When the breast of the linter is elevated the support 10 will be carried upward thus carrying the lever 27 also upward. The float shaft and clutch parts will be likewise elevated. When the parts have been raised sufficient to bring the horizontal arm of the lever in engagement with the upper edge of the slot 28, said lever will be swung thereby sliding the member 22 out of engagement with the hub 19 and interrupting the revolution of the float shaft and float. When the breast is lowered the clutch parts will be engaged when the lever strikes the lower end of the slot 28. However a coil spring 32 mounted on the standard 4 is engaged by the lever previous to its engagement with the lower edge of said slot and throws the member 22 into engagement with the hub 19. Should the points of the teeth strike the spring will yield and thus prevent injury to said teeth.

All linters now in common use have their breasts hinged along their upper rear edges and it is not believed necessary to illustrate this well known construction. For observing the saws it is only necessary to raise the breast three or four inches and in fact this is sufficient to remove any foreign matter from the saws. The slot 11 permits such a movement. If it is desired to entirely open the breast the parts would have to be removed.

What I claim, is:

In a device of the character described, the combination with a driving shaft and a driven shaft, and supports in which the shafts are mounted, the driven shaft support being movable relatively to the other support, of sprocket wheels mounted on said shafts, a curved bar mounted at its upper end on the driven shaft, an idler sprocket mounted on the lower end of the bar in line with the other sprockets, the bar having a limited longitudinal movement relative to the driving shaft support, an endless chain passed around the driven shaft sprocket and the idler sprocket and passing over the driving shaft sprocket, the driven sprocket being loose on the driven shaft and having a clutch hub, a clutch member keyed on the driven shaft, a clutch tripping device mounted on the bar and having connection with the clutch member, and means mounted on the driving shaft support for operating the tripping device when the bar is raised longitudinally.

In testimony whereof I have signed my name to this specification in the presence of two subscribing witnesses.

LOUIS K. STEPHENS.

Witnesses:
 LELAN SCHLEY,
 JACK A. SCHLEY.